US009797405B1

(12) United States Patent
Mowris et al.

(10) Patent No.: US 9,797,405 B1
(45) Date of Patent: Oct. 24, 2017

(54) METHOD FOR EFFICIENT FAN CONTROL FOR ELECTRIC OR GAS FURNACES AND HEAT PUMPS IN HEATING MODE

(76) Inventors: Robert J. Mowris, Olympic Valley, CA (US); John Walsh, Bozeman, MT (US)

( * ) Notice: Subject to any disclaimer, the term of this patent is extended or adjusted under 35 U.S.C. 154(b) by 587 days.

(21) Appl. No.: 13/427,542

(22) Filed: Mar. 22, 2012

(51) Int. Cl.
*F04D 27/00* (2006.01)
*F24F 11/00* (2006.01)
*F01D 21/00* (2006.01)
*F01D 19/02* (2006.01)

(52) U.S. Cl.
CPC ......... *F04D 27/004* (2013.01); *F01D 21/003* (2013.01); *F04D 27/007* (2013.01); *F24F 11/001* (2013.01); *F24F 11/006* (2013.01); *F24F 11/0079* (2013.01); *F01D 19/02* (2013.01); *F24F 2011/0073* (2013.01); *F24F 2011/0075* (2013.01)

(58) Field of Classification Search
CPC .... F04D 27/003; F04D 27/004; F04D 27/007; F04D 27/008; F04D 27/00; F01D 19/00; F01D 19/02; F01D 21/003; F01D 21/12; F24F 11/001; F24F 11/0012; F24F 11/006; F24F 11/0076; F24F 11/0079; F24F 2011/0013; F24F 2011/0045; F24F 2011/0061; F24F 2011/0063; F24F 2011/0064; F24F 2011/0072; F24F 2011/0073; F24F 2011/0075
USPC ....... 415/1, 17, 51; 416/1; 454/74, 229, 236, 454/239, 256; 126/84
See application file for complete search history.

(56) References Cited

U.S. PATENT DOCUMENTS

| 2,394,920 A | | 12/1942 | Kronmiller | |
|---|---|---|---|---|
| 3,454,073 A | | 7/1969 | Man | |
| 3,454,078 A | * | 7/1969 | Elwart | G05D 23/1906 165/245 |
| 3,489,345 A | * | 1/1970 | Moreland | F24F 11/00 236/11 |
| 3,912,162 A | * | 10/1975 | Bauer et al. | 236/11 |
| 4,075,864 A | * | 2/1978 | Schrader | 62/180 |
| 4,090,663 A | * | 5/1978 | Bonne | F23N 3/042 165/289 |

(Continued)

FOREIGN PATENT DOCUMENTS

WO PCT/US/1996-009118 6/1996

OTHER PUBLICATIONS

California Energy Commission (CEC) Published Report No. CEC-500-2008-056.
ICM Controls Instructions.

*Primary Examiner* — Craig Kim
*Assistant Examiner* — Wayne A Lambert
(74) *Attorney, Agent, or Firm* — Averill & Green; Kenneth L. Green; Sudip Kundu

(57) ABSTRACT

A method for controlling heater ventilation fan operation increases fan speed from low to high after a short delay after turn-on, and continues fan operation for a period of time based on duration of operation, after turn-off. The higher fan speed improves heat transfer and efficiency while the heating system is operating. Continuing fan operation after turn-off maximizes recovery of additional heat from the heat exchanger. Known methods do not provide sufficient air flow to efficiently transfer heat from the heat exchanger to the air, and leave high temperature air (i.e., 110 to 200° F.) in the heat exchanger after turn-off.

37 Claims, 3 Drawing Sheets

(56) References Cited

U.S. PATENT DOCUMENTS

| | | | | |
|---|---|---|---|---|
| 4,136,730 A * | 1/1979 | Kinsey | | 165/267 |
| 4,167,966 A * | 9/1979 | Freeman | | G05D 23/275 |
| | | | | 165/254 |
| 4,369,916 A * | 1/1983 | Abbey | | F24F 11/08 |
| | | | | 236/11 |
| 4,493,194 A | 1/1985 | Briccetti | | |
| 4,502,625 A * | 3/1985 | Mueller | | F23N 1/002 |
| | | | | 236/11 |
| 4,684,060 A * | 8/1987 | Adams et al. | | 236/11 |
| 4,773,587 A * | 9/1988 | Lipman | | F24F 11/0009 |
| | | | | 165/259 |
| 4,842,044 A * | 6/1989 | Flanders | | G05D 23/275 |
| | | | | 165/244 |
| 4,860,552 A * | 8/1989 | Beckey | | F24D 19/1087 |
| | | | | 237/2 B |
| 5,011,073 A * | 4/1991 | Izaguirre, Sr. | | F24H 9/2085 |
| | | | | 236/11 |
| 5,050,488 A | 9/1991 | Beasley | | |
| 5,142,880 A * | 9/1992 | Bellis | | F24F 11/08 |
| | | | | 62/158 |
| 5,228,307 A | 7/1993 | Koce | | |
| 5,248,083 A * | 9/1993 | Adams et al. | | G05D 23/1913 |
| | | | | 236/11 |
| 5,397,970 A * | 3/1995 | Rowlette et al. | | F24F 11/0009 |
| | | | | 318/400.09 |
| 5,582,233 A * | 12/1996 | Noto | | F24D 19/1084 |
| | | | | 165/247 |
| 5,882,233 A | 3/1999 | Idehara | | |
| 6,282,910 B1 | 9/2001 | Helt | | |
| 6,464,000 B1 * | 10/2002 | Kloster | | F24F 11/0012 |
| | | | | 165/247 |
| 6,684,944 B1 * | 2/2004 | Byrnes et al. | | 165/247 |
| 6,695,046 B1 * | 2/2004 | Byrnes | | F04D 27/00 |
| | | | | 126/110 A |
| 6,940,051 B2 | 9/2005 | Tateishi | | |
| 7,140,551 B2 | 11/2006 | Pauw | | |
| 7,191,826 B2 | 3/2007 | Byrnes | | |
| 7,204,429 B2 * | 4/2007 | Olney | | F24F 11/0079 |
| | | | | 236/49.3 |
| 7,240,851 B2 | 7/2007 | Walsh, Jr. | | |
| 8,362,725 B2 | 1/2013 | Becerra et al. | | |
| 8,763,920 B1 * | 7/2014 | Walsh | | G05D 23/00 |
| | | | | 236/1 C |
| 9,328,933 B2 * | 5/2016 | Walsh | | F24D 19/1084 |
| 2003/0223172 A1 | 12/2003 | Priest | | |
| 2005/0121531 A1 * | 6/2005 | Walsh | | F23N 5/203 |
| | | | | 236/46 R |
| 2005/0150651 A1 | 7/2005 | Halsey | | |
| 2010/0187318 A1 | 7/2010 | Yu | | |
| 2011/0234368 A1 | 9/2011 | Huang | | |
| 2012/0104108 A1 * | 5/2012 | Westberg | | F04D 27/00 |
| | | | | 236/49.3 |
| 2012/0248211 A1 | 10/2012 | Warren et al. | | |
| 2014/0191050 A1 * | 7/2014 | Walsh | | F24D 19/1084 |
| | | | | 237/50 |
| 2015/0060038 A1 | 3/2015 | Lau | | |
| 2015/0060557 A1 | 5/2015 | Lau | | |
| 2015/0159905 A1 | 6/2015 | Lau | | |
| 2016/0223219 A1 | 8/2016 | Lau | | |
| 2016/0245544 A1 | 8/2016 | Walsh | | |

* cited by examiner

Table 1. Efficient Fan Controller Example Operational Logic Schedule

| Heating System Operation P3 (minutes) | Fan Time Delay Off P2 (minutes) | Fan Speed |
|---|---|---|
| Less than 4 minutes | 0 | Low |
| 4 to 5 minutes | 2 minutes | High |
| 5 to 6 minutes | 2.5 minutes | High |
| 6 to 7 minutes | 3 minutes | High |
| 7 to 8 minutes | 3.5 minutes | High |
| 8 minutes or greater | 4 minutes | High |

METHOD FOR EFFICIENT FAN CONTROL FOR ELECTRIC OR GAS FURNACES AND HEAT PUMPS IN HEATING MODE

BACKGROUND OF THE INVENTION

The present invention relates to electric or gas furnaces and electric heat pump (heating) systems in heating mode.

Heating consumption accounts for 41% of total residential energy use in the United States as reported by the US Energy Information Agency Residential Energy Consumption Survey in 2005. Known central heaters are controlled by a thermostat which turns on a heater ventilation fan after a brief delay following turning on a heat source, and turns off the heater ventilation fan after variable temperature based delay or a fixed time delay following turning off the heat source. Unfortunately, maintaining a low heater ventilation fan speed often results in increased heat soak within the central heating unit and the portion of the heat generated by the heat source is lost to the environment increases the longer the central heating element is on at the low heater ventilation fan speed. Further, the amount of heat soak increases as the central heating unit is operated for longer periods of time leaving significantly higher temperature air (i.e., 110 to 200° F.) in the heat exchanger after the heater ventilation fan is turned off and a portion of this heat is also lost to the environment after the heat source and the heater ventilation fan are tuned off.

BRIEF SUMMARY OF THE INVENTION

The present invention addresses the above and other needs by providing a method for efficient heater ventilation fan control. The method includes switching the heater ventilation fan from low speed to high speed after a brief period P1 following starting, and continuing heater ventilation fan operation for a variable period of time P2 after the heat source has stopped. The period P1 is preferably about four minutes, and the period P2 is determined by the duration of heating and is generally between two and four minutes. Operating the heater ventilation fan at high speed improves heat transfer and efficiency while the heating system is operating, increases warm air movement to the space, satisfies the thermostat set point temperature in less time, reduces heating system operation, and reduces energy use compared to conventional fan controllers. Continuing heater ventilation fan operation after turn-off maximizes recovery of additional heat from the heat exchanger to increase heat delivered to conditioned space, improve overall efficiency, extend the off cycle time, and save energy.

In accordance with one aspect of the invention, there are provided methods for optimizing furnace and heat pump heater ventilation fan operation to improve energy efficiency and save energy by increasing fan speed from low to high speed after the heating system is operated for sufficient time to provide useful heating (i.e., supply air temperatures above 100 to 110° F.). High speed fan operation improves heat transfer and efficiency in the heat exchanger and reaches a thermostat setting sooner to reduce furnace operation or heat pump compressor operation. The efficient fan controller continues fan operation after the heating system has stopped operating to recover additional heat from the heat exchanger to increase heat delivered to the conditioned space, improve overall efficiency, extend the off cycle time, and save energy.

In accordance with another aspect of the invention, there are provided methods for optimizing furnace and heat pump heater ventilation fan operation. The length of time of heater operation is saved, and the continued operation of the heater ventilation fan after turn-off is increased for longer periods of operation of the heater based on the saved time of heater operation.

In accordance with yet another aspect of the invention, there is provided improved heating efficiency of seven to ten percent above conventional temperature delay and six to eight percent above conventional time delay. For systems with degraded conventional temperature delay sensors, the invention provides improved heating efficiency of seven to 23 percent.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figures 1, 2:
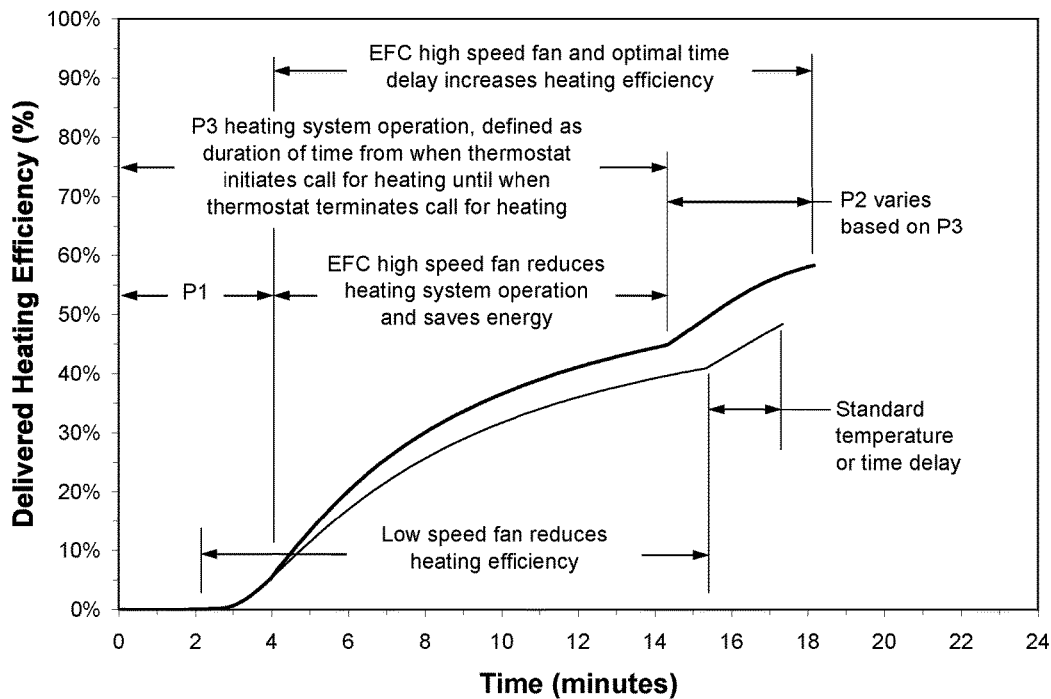
FIG. 1 shows a graph of known control and efficient fan control according to the present invention.
FIG. 2 is a table of extended fan time delay off P2 after heating system operation shut-off as a function of the duration of heater system operation P3, according to the present invention.

A graph comparing known control 10 and efficient fan control 12 according to the present invention is shown in FIG. 1. The efficient fan control 12 optimizes heating system efficiency and reduces electric or gas furnace or heat pump compressor operation by increasing fan speed from low to high four minutes after the heating system is turned on. The efficient fan control 12 further maximizes heat recovery from the heat exchanger after the heating system is turned off with an extended fan delay of two to four minutes, depending on how long the heating system was on during the heating cycle. Conventional time or temperature fan off delay control 10 leave significantly higher temperature air (i.e., 110 to 200° F.) in the heat exchanger which wastes energy.

A table 14 of extended fan operation after shut-off period, as a function of the duration of heater system operation, according to the present invention, is shown in FIG. 2. For less than four minutes of operation, no significant amount of heat has been stored in the heat exchanger. Between four and eight minutes of operation, varying amounts of heat have been stored in the heat exchanger. For greater than eight minutes of operation, a steady state amount of heat has been stored in the heat exchanger. The fan off delay is matched to the amount of heat stored in the heat exchanger to extract that heat.

Figure 3:
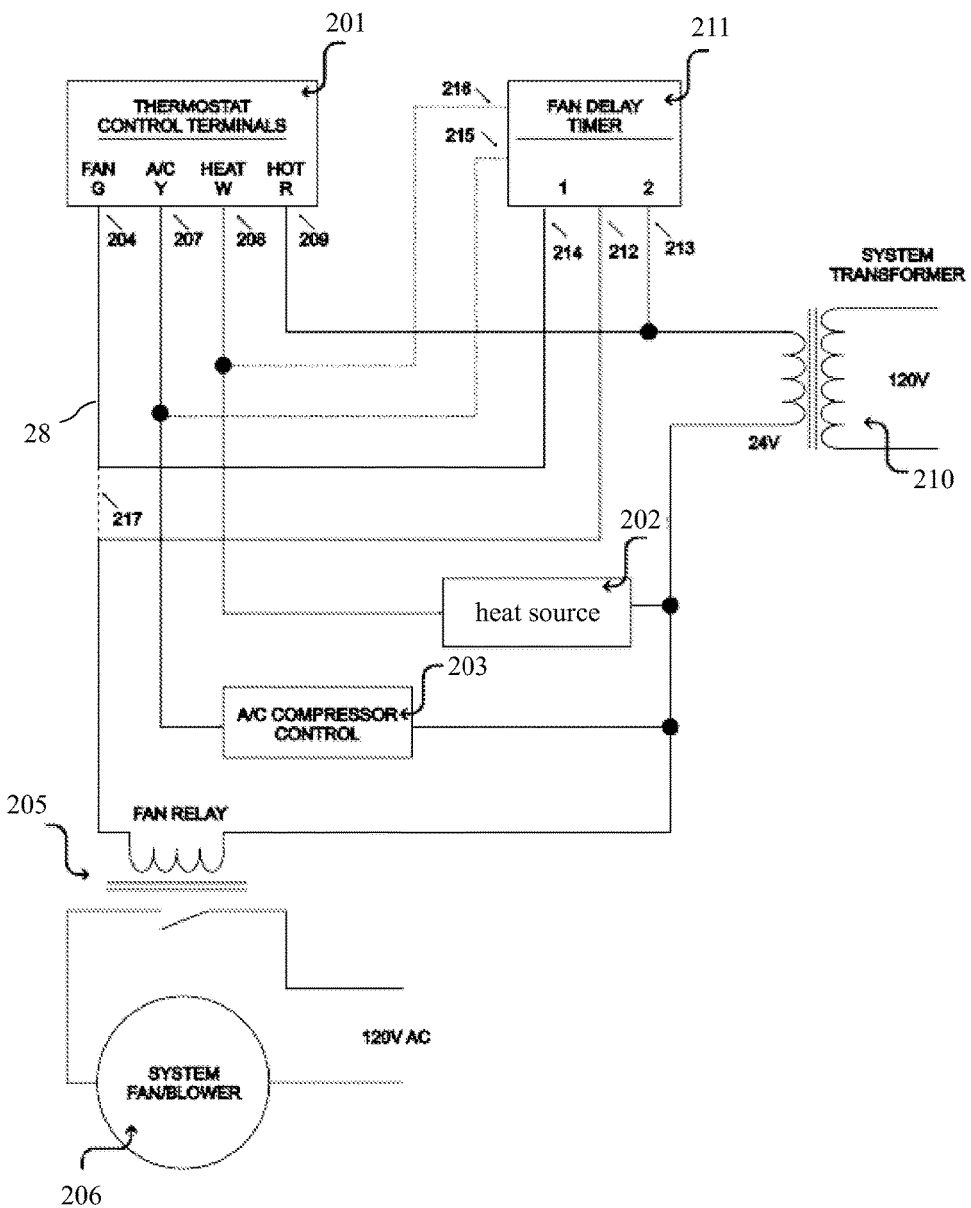
FIG. 3 shows the efficient fan control connections to a known heater circuit according to the present invention.

The connection of an efficient fan controller (i.e., fan delay timer) 211 to a heater circuit including a known thermostat 201 is shown in FIG. 3. The efficient fan controller 211 may be connected as shown to a heat source control circuitry (e.g., a furnace control) 202, and optionally, an air conditioning compressor control 203. Prior to the installation of the present invention, the fan contact terminal 204 connects the thermostat 201 through wire 28 to the fan/blower relay 205. With the addition of the present invention, the connection between the thermostat 201 and fan relay 205 is opened as shown by broken line 217. The wire 28 is reconnected from the thermostat terminal 204 to terminal 214 of the controller 211 and terminal 212 of the controller 211 is connected to the fan relay 205. When actuated, the fan relay 205 connects the system fan/blower 206 to the 24 volt AC transformer 210. The air conditioning contact terminal 207 of the thermostat 201 is connected to the air conditioning compressor control circuitry 203. The heater contact terminal 208 of the thermostat 201 is connected to the heat source control circuitry 202. The hot terminal 209 of the thermostat 201 connects to the hot side of the 24 volt AC transformer 210.

A connection 216 on the controller 211 is shown connected to the terminal 208 of the thermostat 201. This wiring path is used in a system where the heat fan time is extended. In the preferred embodiment, no additional power connections are required, unlike some prior art, which requires either a dedicated connection to the transformer or another relay. The controller 211 draws power through the fan/blower relay 205, thus eliminating the need for external power generally required for similar controllers.

Figure 4:
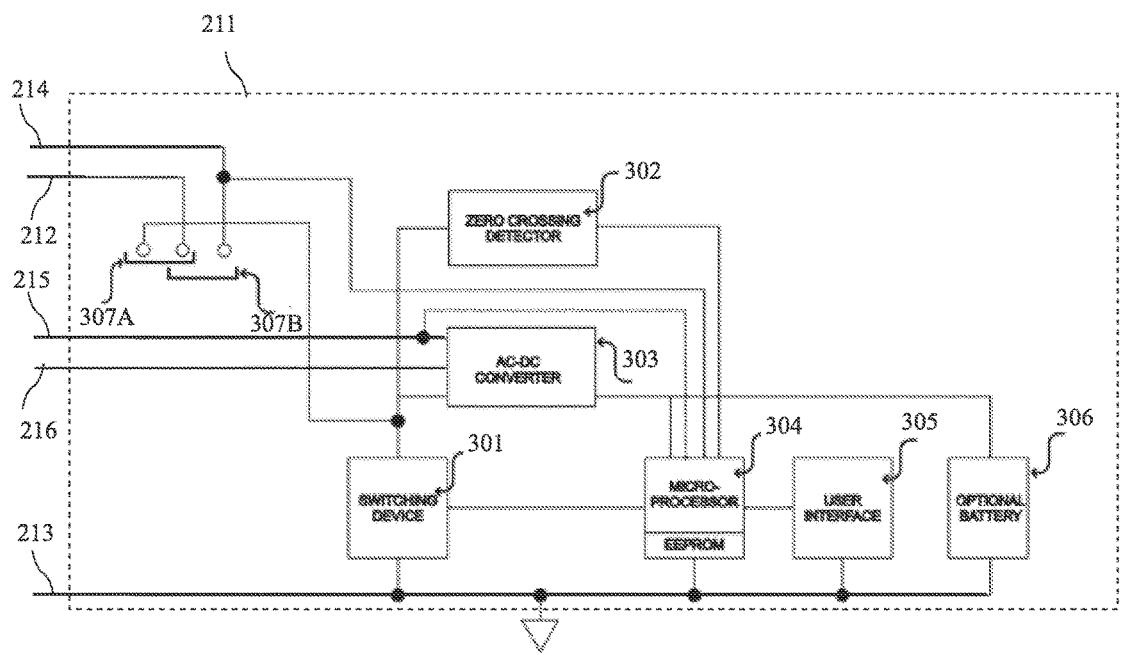
FIG. 4 shows a circuit for executing the efficient fan control, according to the present invention.

An example of a controller 211 circuit according to the present invention is shown in FIG. 4 in block diagram format. A microprocessor 304 is used to control a switch 301, receive an input, and provide an output to a user interface 305. The microprocessor 304 receives power from an AC/DC converter 303 and also receives input from a zero crossing detector 302, the line from the thermostat fan switch 213, and optionally the input that enables the NC compressor 215. The microprocessor 304 performs several major functions. In terms of timing, the microprocessor 304 keeps track of seconds and minutes by monitoring the AC line signal. Each positive zero crossing accounts for 1/60th of a second; therefore, sixty positive crossings occur each second. The seconds are then accumulated to keep track of minutes. The negative crossings are also monitored to provide timing for the switch. In the event the switch is a Triode Alternating Current switch (TRIAC), it must be triggered at each positive and negative zero crossing of the AC line. A TRIAC is a gated switching device that will conduct current in either direction.

The user interface 305 is an input device to the microprocessor 304 and provides visual outputs to a user which enable programming of the controller 211. The microprocessor 304 continuously monitors the user interface 305 to determine if there is any change to the current system operation. If a change is requested by the user, the current programming of a switch state is set to neutral (switch is turned off) and the user interface 305 is monitored to determine the user's requested action. In the preferred embodiment, the microprocessor 304 contains an EEPROM, which allows the microprocessor 304 to store the user's programming instructions when there is no power applied to the controller 211.

The AC/DC converter 303 is used to condition the input 24 VAC signal from the 24 volt AC transformer 210 into the DC signal necessary to operate the DC devices within the controller 211. The zero crossing detector 302 is used to condition the 24 volt AC input to a level that will not damage the microprocessor 304. The microprocessor 304 generates an interrupt in both the positive going and negative going zero crossings and uses this zero crossing timing to keep track of elapsed time and also to determine when to fire the TRIAC, which may be used as the switching device 301. The switching device 301 could be either a standard relay type device, a reed relay or some other electro-mechanical device. The switching device 301 could also be a solid state device such as a Field Effect Transistor (FET) (a semiconductor device that outputs current in proportion to its input voltage) switch or a TRIAC. The FET uses a small amount of control current to regulate a larger output current. Switching devices generally require minor modifications for use in the controller 211, and a controller 211 including any suitable switching device is intended to come within the scope of the present invention. While the presently described embodiment of the controller 211 is based on a TRIAC switch, the present invention is not limited to any specific type of switching device.

Figure 5:
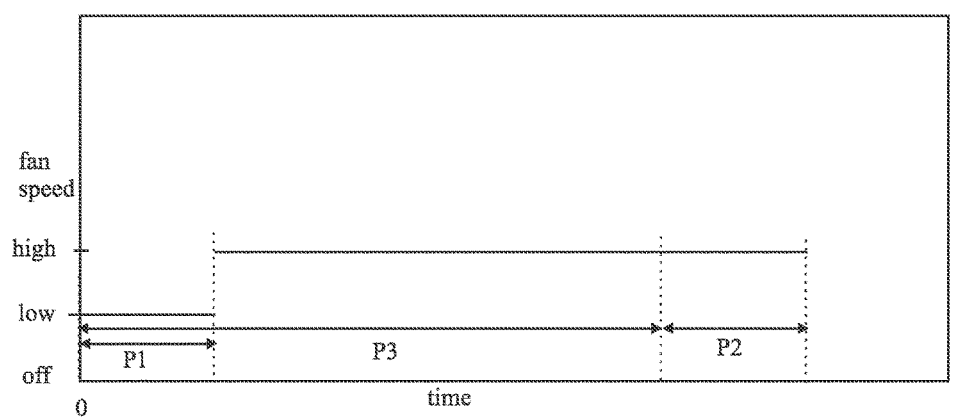
FIG. 5 shows a chart of time periods P1, P3, and P2.

Figure Reference Numbers include:
Number 201 is the existing household thermostat;
Number 202 is the heating system (i.e., furnace or heat pump) control circuitry;
Number 203 is the air conditioning compressor controller;
Number 204 is the fan contact terminal;
Number 205 is the fan/blower relay;
Number 206 is the ventilation fan/blower;
Number 207 is the air conditioning contact terminal;
Number 208 is the heater contact terminal;
Number 209 is the hot contact terminal;
Number 210 is the system 24 volt alternating current (VAC) transformer;
Number 211 is the external thermostat fan controller;
Number 212 is the fan relay lead;
Number 213 is the transformer hot lead;
Number 214 is the thermostat fan activation switch lead;
Number 215 is the optional lead to thermostat air conditioning compressor terminal;
Number 216 is the optional lead to thermostat heat terminal;
Number 217 is the break in wiring thermostat to fan relay;
Number 301 is the zero crossing detector;
Number 302 is the AC/DC converter;
Number 304 is the microprocessor;
Number 305 is the user interface;
Number 306 is the optional battery;
Number 307A is the on/off switch in "on" position; and
Number 307B is the on/off switch in "off" position.
FIG. 5 shows a chart of time periods P1, P3, and P2.

While the invention herein disclosed has been described by means of specific embodiments and applications thereof, numerous modifications and variations could be made thereto by those skilled in the art without departing from the scope of the invention set forth in the claims.

We claim:
1. A method for controlling a heating system ventilation fan, the method comprising:
controlling a fan relay signal from a thermostat to a fan relay, the fan relay normally controlled by a thermostat G terminal to control the ventilation fan to circulate air through a heating system;

monitoring a heating system operating time defined from when the thermostat is initiating a call for heating until when the thermostat is terminating the call for heating;

after the thermostat initiates the call for heating, performing at least one action selected from the group consisting of:
- turning on the ventilation fan after an initial delay to circulate air through the heating system,
- energizing the fan relay normally controlled by the thermostat G terminal to circulate air through the heating system, and
- waiting while the heating system is turning on the ventilation fan to circulate air through the heating system and waiting a first period of time P1 with the ventilation fan operating, and after the period of time P1, energizing the fan relay normally controlled by the thermostat G terminal to circulate air through the heating system;

continuing to circulate air through the heating system and the thermostat continuing calling for heating until a selected thermostat set point temperature is satisfied;

the thermostat terminating the call for heating when the thermostat set point temperature is satisfied thereby turning off the heating system;

setting a heating system operation time P3 to the length of time from when the thermostat is initiating a call for heating until when the thermostat is terminating the call for heating;

computing an extended fan-off delay period of time P2 as a function of the heating system operation time P3 and energizing the fan relay signal for the entire fan-off delay period of time P2, and de-energizing the fan relay signal at the end of the fan-off delay period of time P2.

2. The method of claim 1, wherein:
if the heating system operation time P3 is less than or equal to a period of time required where no significant amount of heat is stored in the heat exchanger of the heating system, then the fan-off delay period of time P2 is zero; and
if the heating system operation time P3 is greater than the period of time required where no significant amount of heat is stored in the heat exchanger of the heating system, then the fan-off delay period of time P2 varies as a function of the heating system operation time P3.

3. The method of claim 2, wherein the period of time required where no significant amount of heat is stored in the heat exchanger of the heating system is about four minutes, and if the heating system operation time P3 is about four minutes or greater, the fan-off delay period of time P2 increases from zero minutes to about four minutes as a function of the heating system operation time P3 increasing from about four minutes to about eight minutes, and the fan-off delay period of time P2 is about four minutes for the heating system operation time P3 greater than about eight minutes.

4. Method of claim 2, wherein the fan-off delay period of time P2 is zero for the heating system operation time P3 varying from zero minutes to less than about 4 minutes.

5. The method of claim 1, wherein the ventilation fan is a multiple discrete speed fan.

6. The method of claim 1, wherein energizing the fan relay signal increases the fan speed of the ventilation fan to a fan speed higher than a low heater ventilation fan speed when the fan relay is de-energized.

7. The method of claim 6, wherein energizing the fan relay normally controlled by the thermostat G terminal comprises:

interrupting a fan control signal from the thermostat G terminal to the fan relay; and
sending a fan relay activation signal to the fan relay used to energize the ventilation fan.

8. The method of claim 1, wherein energizing the fan relay signal switches the ventilation fan speed to a higher speed than when the fan relay signal is not energized.

9. The method of claim 1, wherein de-energizing the fan relay signal and turning off the ventilation fan after the fan-off delay period of time P2 comprises removing power provided to the ventilation fan through the fan relay at the end of the fan-off delay period of time P2.

10. The method of claim 1, wherein energizing the fan relay signal comprises energizing the fan relay and turning the ventilation fan from a low speed to a high speed after the heating system has operated for sufficient time to provide useful heating, wherein the high speed is higher than a low heater ventilation fan speed achieved before the fan relay is energized, for the entire fan-off delay period of time P2.

11. The method of claim 1, further including energizing the fan relay, thereby turning the ventilation fan to a high speed higher than a low heater ventilation fan speed controlled by the heater during the heating system operation time P3 following the first period of time P1.

12. The method of claim 1, further including first steps of:
physically disconnecting a first electrical connection between a thermostat G terminal (204) on a thermostat or equipment control terminals (201) and a fan relay terminal (205) used to control the ventilation fan;
connecting a second electrical connection between the thermostat G terminal (204) on the thermostat or equipment control terminals (201) to a first fan controller terminal (214) on a fan controller (211);
connecting a second fan controller terminal (212) on the fan controller (211) to the fan relay (205) used to control the ventilation fan (206);
connecting a thermostat W terminal (208) to a third fan controller input (216) of a fan controller (211) used to monitor a heating system operating time P3 defined from when the thermostat is initiating a call for heating until when the thermostat is terminating the call for heating; and
the fan controller (211) continuing ventilation fan (206) operation for a fan off delay period of time P2 based on the heating system operation time P3.

13. The method of claim 1, wherein the fan controller is energizing the fan relay normally controlled by the thermostat G terminal whenever a signal is present on the thermostat G terminal.

14. The method of claim 1, wherein the heating system is a heat pump or electric furnace.

15. A method for efficiently controlling a ventilation fan, the method comprising:
turning on a heating system when a thermostat is initiating a call for heating;
turning on the ventilation fan by at least one control device selected from the group consisting of:
the thermostat,
the heating system, and
a fan controller;
continuing the call for heating by the thermostat and continuing to circulate air through the heating system by the ventilation fan until a selected thermostat set point temperature is satisfied;
terminating the call for heating by the thermostat when the thermostat set point temperature is satisfied defining the end of the heating system operation time P3, thereby turning off the heating system;

setting the heating system operation time P3 to the length of time from when the thermostat is initiating a call for heating until when the thermostat is terminating the call for heating;

determining a ventilation fan-off delay period of time P2 as function of the heating system operation time P3 and energizing a ventilation fan relay for the entire fan-off delay period of time P2, and de-energizing the ventilation fan relay controlled by a thermostat G terminal after the fan-off delay period of time P2.

16. The method of claim 15, further including, the fan controller receiving an air conditioning compressor signal present on a thermostat Y terminal.

17. The method of claim 15, further including, the fan controller drawing a 24 VAC power signal through the fan relay.

18. The method of claim 17, further including:
the fan controller including an AC-DC converter converting the 24 VAC power signal to a DC signal; and
the AC-DC converter providing the DC signal to a microprocessor in the fan controller.

19. The method of claim 18, wherein:
the fan controller activating the fan relay comprises the microprocessor processing a heater signal to generate a control signal to a switch; and
the fan controller activating the fan relay comprises the switch switching the 24 VAC power signal to activate the fan relay normally controlled by the thermostat G terminal.

20. The method of claim 17, further including:
a zero crossing detector detecting zero crossings in the 24 VAC power signal; and the crossing detector providing zero crossing information to a microprocessor in the fan controller to keep track of time.

21. The method of claim 15, wherein:
if the heating system operation time P3 is less than or equal to a period of time where no significant amount of heat is stored in the heat exchanger of the heating system, then the fan-off delay period of time P2 is zero; and
if the heating system operation time P3 is greater, then the fan-off delay period of time P2 varies as a function of the heating system operation time P3.

22. A method for controlling a ventilation fan by a fan controller, the method comprising:
interrupting a direct electrical connection between a thermostat G terminal to a fan relay normally controlled by the thermostat G terminal, the fan relay providing power to the ventilation fan;
after the thermostat initiates the call for heating and energizes the thermostat W terminal, performing at least one action selected from the group consisting of:
turning on the ventilation fan after an initial delay to circulate air through a heating system,
energizing the fan relay normally controlled by the thermostat G terminal to circulate air through the heating system, and
waiting while the heating system is turning on the ventilation fan to circulate air through the heating system and waiting a first period of time P1 with the ventilation fan operating, and after the period of time P1, energizing the fan relay normally controlled by the thermostat G terminal to circulate air through the heating system;

continuing the thermostat call for heating and energizing the thermostat W control terminal and continuing energizing the fan relay to circulate air through the heating system for the entire heating system operation time P3 until a selected thermostat set point temperature is satisfied;

setting the heating system operation time P3 to the duration of the signal present on the thermostat W terminal based on the length of time from when the thermostat is initiating a call for heating until when the thermostat is terminating the call for heating;

determining a fan-off delay period of time P2 as a function of the heating system operation time P3 and continuing to circulate air through the heating system for the entire fan-off delay period of time P2 and de-energizing the fan relay and turning off the ventilation fan at the end of the fan-off delay period of time P2.

23. The method of claim 22, further including, the fan controller drawing a 24 VAC power signal through the fan relay.

24. The method of claim 22, further including:
the fan controller including an AC-DC converter converting the 24 VAC power signal to a DC signal; and
the AC-DC converter providing the DC signal to a microprocessor in the fan controller.

25. The method of claim 22, wherein:
the fan controller activating the fan relay comprises a microprocessor processing a heater signal on the thermostat W terminal to generate a control signal to a switching device; and
the fan controller activating the fan relay comprises the switching device switching a 24 VAC power signal to energize the fan relay and the fan relay turning on the ventilation fan.

26. The method of claim 22, further including:
a zero crossing detector detecting zero crossings in a 24 VAC power signal; and the zero crossing detector providing zero crossing information to a microprocessor in the fan controller to keep track of time.

27. The method of claim 22, wherein the period of time required to store any significant amount of heat in a heat exchanger of the heating system is about 4 minutes or where no significant amount of heat has been stored in the heat exchanger of the heating system.

28. The method of claim 22, wherein energizing the fan relay, normally controlled by the thermostat G terminal switches the ventilation fan to a fan speed higher than a low heater ventilation fan speed.

29. The method of claim 22, wherein:
if the heating system operation time P3 is less than or equal to a period of time required where no significant amount of heat is stored in the heat exchanger of the heating system, then the fan-off delay period of time P2 is zero; and
if the heating system operation time P3 is greater, then the fan-off delay period of time P2 varies as a function of the heating system operation time P3.

30. A method for efficiently controlling a ventilation fan, the method comprising:
turning on a heating system when a thermostat initiates a call for heating;
turning on the ventilation fan by at least one control device selected from the group consisting of:
the thermostat,
the heating system, and
a fan controller;
monitoring a thermostat call for heating;

determining a heating system operation time P3 as the length of time from when the thermostat is initiating the call for heating until when the thermostat is terminating the call for heating;

determining a ventilation fan-off delay time P2 as function of the heating system operation time P3 based on the heating system operation time P3, and continuing energizing the ventilation fan for the entire fan-off delay time P2, and de-energizing the ventilation fan after the fan-off delay time P2.

31. The method of claim 30, wherein the fan-off delay time P2 is zero for the heating system operation time P3 less than or equal to the period of time where no significant amount of heat has been stored in a heat exchanger of the heating system.

32. The method of claim 30, wherein the fan-off delay time P2 for a heating system is zero minutes for the heating system operation time P3 less than about four minutes, and the fan-off delay period of time P2 varies from zero minutes to about four minutes as a function of the heating system operation time P3 varying from about four minutes to about eight minutes, and the fan-off delay period of time P2 is about four minutes for the heating system operation time P3 greater than about eight minutes.

33. A method for efficiently controlling a heating system ventilation fan, the method comprising:

monitoring a duration of a thermostat call for heating time P3 defined from when the thermostat is initiating a call for heating until when the thermostat is terminating the call for heating; and continuing the heating system ventilation fan operation for a variable period of time P2 after the thermostat call for heating has ended based on the duration of the thermostat call for heating time P3.

34. The method of claim 33, wherein the variable period of time P2 is zero minutes for the duration of the thermostat call for heating time P3 less than about four minutes, and the variable period of time P2 increases from zero minutes to about four minutes as a function of the duration of the thermostat call for heating time P3 increasing from about four minutes to about eight minutes, and the variable period of time P2 is about four minutes for the duration of the thermostat call for heating time P3 greater than about eight minutes.

35. The method of claim 33, wherein the heating system is a heat pump or an electric furnace.

36. The method of claim 33, wherein:

if a heating system operation time P3 is less than or equal to a period of time where no significant amount of heat is stored in the heat exchanger of the heating system, then the fan-off delay period of time P2 is zero; and if the heating system operation time P3 is greater than the period of time where no significant amount of heat is stored in the heat exchanger of the heating system, then the fan-off delay period of time P2 varies as a function of the heating system operation time P3.

37. A method for connecting a fan controller (211) to an existing heating system including a fan, and controlling the fan by the fan controller (211), the method comprising:

disconnecting a first electrical connection between a thermostat G terminal (204) on thermostat or equipment control terminals (201) and a fan relay terminal (205) used to control the fan (206);

connecting a second electrical connection between the thermostat G terminal (204) on thermostat or equipment control terminals (201) to a first fan controller terminal (214) on a fan controller (211);

connecting a second fan controller terminal (212) on the fan controller (211) to the fan relay (205) used to control the fan (206);

connecting a thermostat W terminal (208) to a third fan controller input (216) of a fan controller (211) used to monitor a heating system operating time P3 defined from when the thermostat is initiating a call for heating until when the thermostat is terminating the call for heating;

determining an amount of time a heater ventilation fan operation time P2 is extended after the heating cycle based on the duration of a heating system operating time P3 defined from when the thermostat is initiating a call for heating until when the thermostat is terminating the call for heating; and the fan controller (211) continuing the heater ventilation fan operation time P2 based on the heating system operation time P3.

* * * * *